(12) United States Patent (10) Patent No.: US 9,143,658 B2
Matsuoka (45) Date of Patent: Sep. 22, 2015

(54) IMAGE PROCESSING APPARATUS AND PROCESSING METHOD THEREOF

(71) Applicant: CANON KABUSHIKI KAISHA, Tokyo (JP)

(72) Inventor: Hirochika Matsuoka, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/861,647

(22) Filed: Apr. 12, 2013

(65) Prior Publication Data

US 2013/0271665 A1 Oct. 17, 2013

(30) Foreign Application Priority Data

Apr. 17, 2012 (JP) .................................. 2012-094177
Apr. 8, 2013 (JP) .................................. 2013-080843

(51) Int. Cl.
*G06K 9/40* (2006.01)
*H04N 5/21* (2006.01)
*G06T 5/00* (2006.01)

(52) U.S. Cl.
CPC ........ *H04N 5/21* (2013.01); *G06T 5/002* (2013.01); *G06T 2207/10016* (2013.01); *G06T 2207/20182* (2013.01)

(58) Field of Classification Search
CPC ............ G06T 5/002; G06T 2207/10016; G06T 2207/20182; G11B 27/10; H04N 5/21
USPC ............ 382/275, 268, 260, 254, 276; 375/240.26, 240.18
See application file for complete search history.

(56) References Cited

U.S. PATENT DOCUMENTS

| | | | |
|---|---|---|---|
| 6,330,673 B1 * | 12/2001 | Levine | 713/176 |
| 6,633,667 B1 * | 10/2003 | Matsuoka | 382/162 |
| 6,999,634 B2 * | 2/2006 | Hong | 382/275 |
| 7,664,337 B2 * | 2/2010 | Balram et al. | 382/268 |
| 7,738,722 B2 * | 6/2010 | Gomila et al. | 382/254 |
| 7,792,381 B2 * | 9/2010 | Rhee | 382/260 |
| 8,063,993 B2 * | 11/2011 | Peng | 348/607 |
| 8,447,124 B2 * | 5/2013 | Llach et al. | 382/233 |
| 8,447,127 B2 * | 5/2013 | Gomila et al. | 382/254 |
| 8,472,526 B2 * | 6/2013 | Gomila et al. | 375/240.18 |
| 2007/0140588 A1 * | 6/2007 | Balram et al. | 382/275 |
| 2007/0276662 A1 * | 11/2007 | Akamine et al. | 704/233 |
| 2008/0118179 A1 * | 5/2008 | Jeong et al. | 382/275 |
| 2008/0152250 A1 * | 6/2008 | Gomila et al. | 382/260 |
| 2008/0152256 A1 * | 6/2008 | Ou et al. | 382/276 |
| 2012/0050492 A1 * | 3/2012 | Moriwake | 348/47 |
| 2012/0257063 A1 * | 10/2012 | Moriwake | 348/159 |

FOREIGN PATENT DOCUMENTS

JP 2007-174667 A 7/2007
JP 2008-187260 A 8/2008

* cited by examiner

*Primary Examiner* — Mekonen Bekele
(74) *Attorney, Agent, or Firm* — Carter, DeLuca, Farrell & Schmidt, LLP

(57) ABSTRACT

Provided are an apparatus and method that obtain a numerical value for an evaluation value of an appearance of noise in a plurality of videos and that coordinate the appearance of noise based on the evaluation value. In an image processing apparatus that coordinates an appearance of noise among a plurality of videos, noise properties are obtained from the videos, and a noise evaluation value is calculated based on the noise properties. Based on the calculated noise evaluation value, noise to be added to the videos is calculated, and the added noise is then added to the videos.

9 Claims, 13 Drawing Sheets

F I G. 1
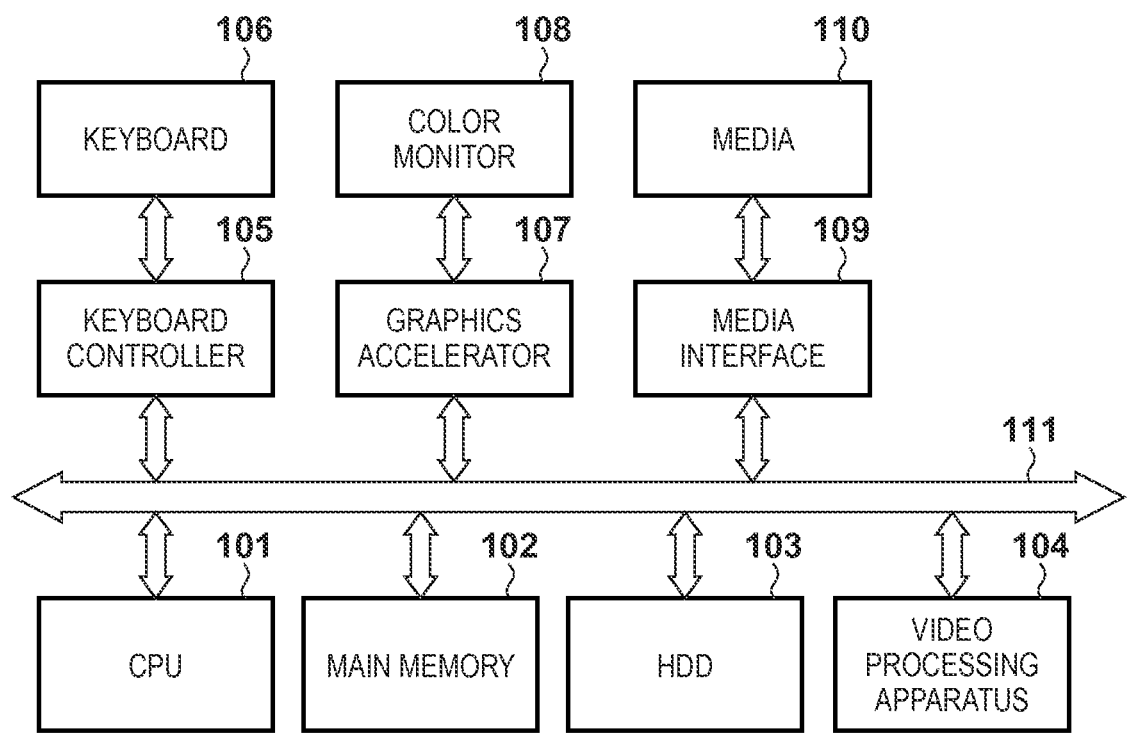

FIG. 2

| Address | | | | |
|---|---|---|---|---|
| 0000 | ax(0) | ax(1) | ax(2) | ax(3) |
| 0010 | ax(4) | ax(5) | ax(6) | ax(7) |
| 0020 | ax(8) | ax(9) | ax(10) | ax(11) |
| ⋮ | | | | |
| 0100 | ay(0) | ay(1) | ay(2) | ay(3) |
| 0110 | ay(4) | ay(5) | ay(6) | ay(7) |
| 0120 | ay(8) | ay(9) | ay(10) | ay(11) |
| ⋮ | | | | |
| 0200 | at(0) | at(1) | at(2) | at(3) |
| 0210 | at(4) | at(5) | at(6) | at(7) |
| 0220 | at(8) | at(9) | at(10) | at(11) |
| ⋮ | | | | |
| 0300 ⋮ | VIDEO SIGNAL | | | |

F I G. 4
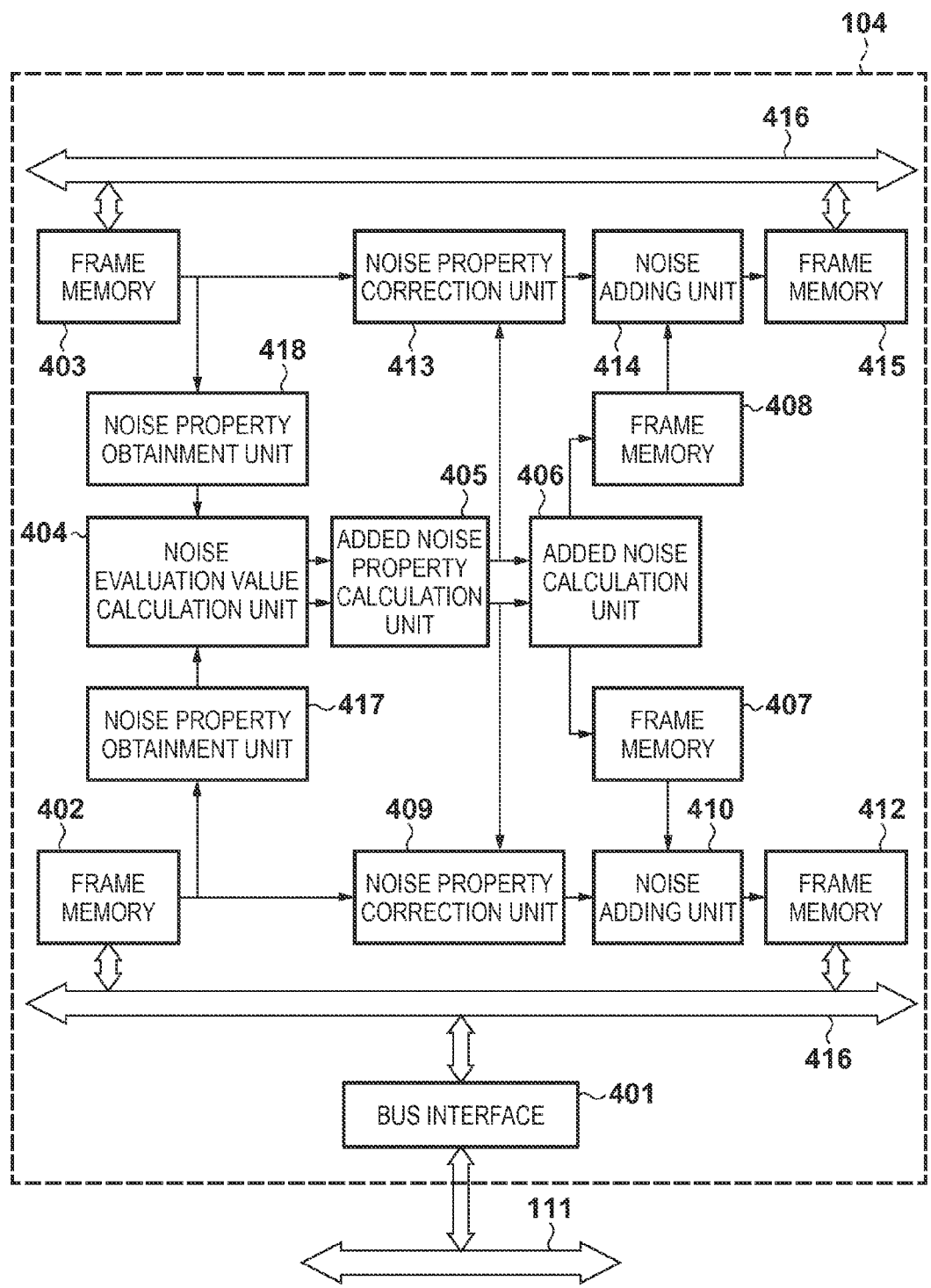

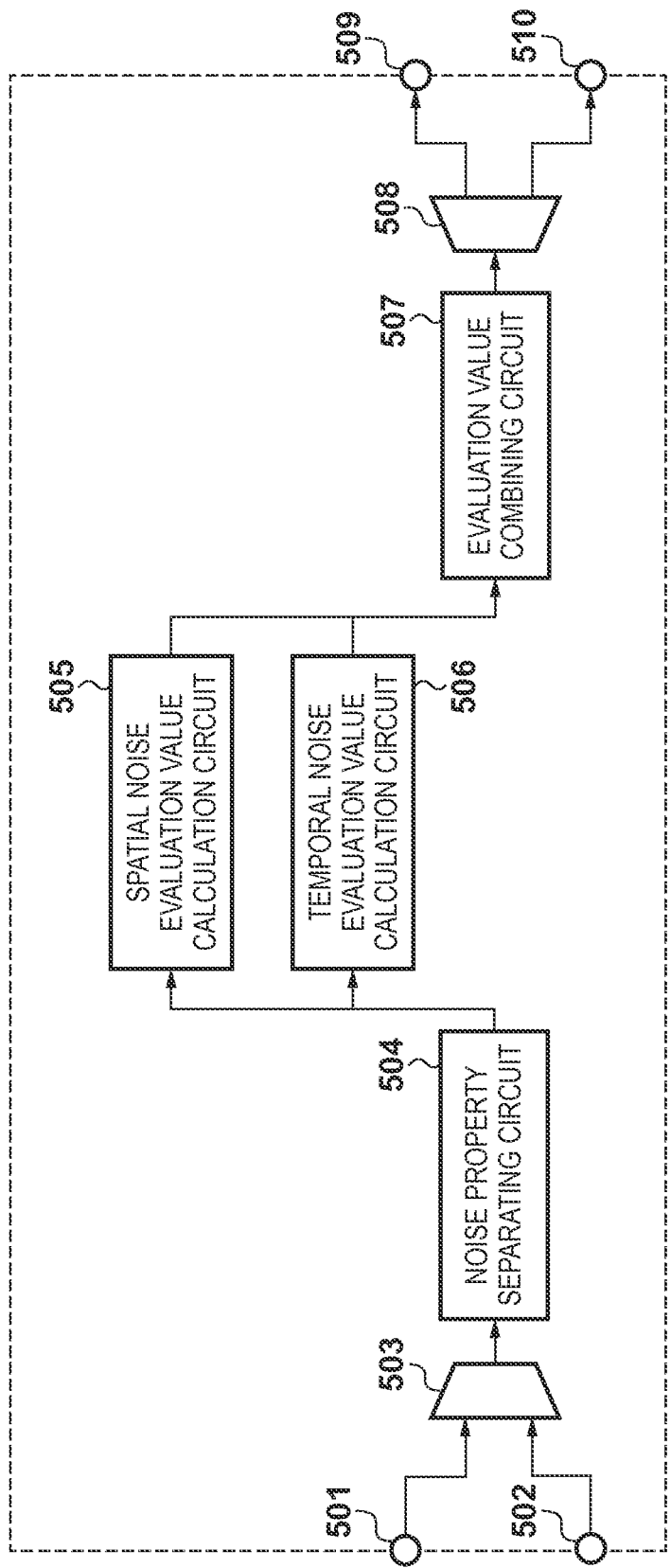

IMAGE PROCESSING APPARATUS AND PROCESSING METHOD THEREOF

BACKGROUND OF THE INVENTION

1. Field of the Invention

The present invention relates to techniques for correcting an appearance of noise in a video.

2. Description of the Related Art

With recent advancements in digitization of videos, controlling an appearance of noise in digital videos has become an issue. Here, techniques such as that disclosed in Japanese Patent Laid-Open No. 2007-174667, which add noise that resembles film grain, and techniques such as that disclosed in Japanese Patent Laid-Open No. 2008-187260, which add noise to the location of a primary subject in order to improve a sense of sharpness, have been proposed as techniques for controlling the appearance of noise in a video.

When editing videos so as to synthesize videos, stitch videos together, or the like, a plurality of videos shot using different imaging devices, under different shooting conditions, and so on are edited into a single video. However, there are cases where differences in the appearance of noise between videos are evident after the editing, leaving a viewer with a sense of incongruity. Accordingly, it is necessary, when synthesizing videos, stitching videos together, or the like, to coordinate the appearance of noise between the plurality of videos in advance.

However, Japanese Patent Laid-Open No. 2007-174667 only discloses a technique for adding noise, such as grain noise, universally throughout videos. Accordingly, in order to cause the appearance of noise to match throughout the videos, there are cases where it is necessary to add noise in such an amount that the noise originally contained in the videos does not stand out, and it is also necessary for the editor him/herself to adjust the amount of noise.

Meanwhile, although Japanese Patent Laid-Open No. 2008-187260 does implement noise addition in accordance with the videos, the noise addition is based on the location of the primary subject, and thus it is ultimately necessary for the editor him/herself to adjust the amount of noise in order to coordinate the appearance of noise throughout the plurality of videos.

SUMMARY OF THE INVENTION

The present invention provides an apparatus and method that obtain a numerical value for an evaluation value of an appearance of noise in a plurality of videos and that coordinate the appearance of noise based on the evaluation value.

The present invention is an image processing apparatus that coordinates an appearance of noise among a plurality of videos, and comprises: a noise property obtainment unit that obtains noise properties from the videos; an evaluation value calculation unit that calculates noise evaluation values based on the noise properties; an added noise calculation unit that calculates noises to be added to the videos based on the noise evaluation values; and a noise adding unit that adds the added noise to the videos.

According to the present invention, videos in which the appearance of noise is coordinated can be obtained without requiring a video editor to perform burdensome adjustments.

Further features of the present invention will become apparent from the following description of exemplary embodiments (with reference to the attached drawings).

BRIEF DESCRIPTION OF THE DRAWINGS

FIG. 1 is a block diagram illustrating the overall system configuration of an image processing apparatus.

FIG. 2 is a schematic diagram illustrating the data structure of video data.

FIG. 4 is a block diagram illustrating the configuration of a video processing apparatus.

FIG. 5 is a diagram illustrating, in detail, the configuration of a noise evaluation value calculation unit.

DESCRIPTION OF THE EMBODIMENTS

Figure 3A:
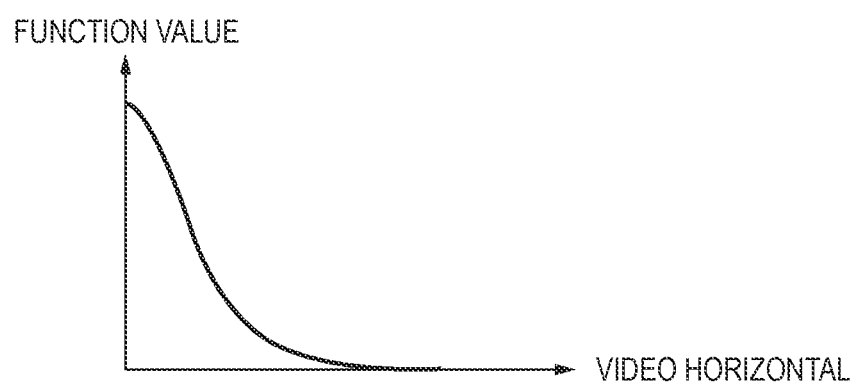
FIGS. 3A, 3B, and 3C are schematic diagrams illustrating noise autocorrelation functions.

Embodiments for Carrying Out the Invention will be described in detail hereinafter with reference to the drawings.

First Embodiment

First, the overall system configuration of an image processing apparatus will be described using the block diagram illustrated in FIG. 1. A CPU 101 executes an operating system (OS) and various types of programs stored in a ROM of a main memory 102, a hard disk drive (HDD) 103, or the like, using a RAM in the main memory 102 as a working memory. The CPU 101 also controls various constituent elements via a system bus 111, such as a PCI (Peripheral Component Interconnect) bus.

The HDD 103 stores various types of programs and video data, and along with transferring the video data to a video processing apparatus 104, receives processed video data from the video processing apparatus 104 and stores that data. The video processing apparatus 104 temporarily stores two pieces of video data transferred from the video processing apparatus 104, executes a noise correction process on one or both of the videos, and transfers the processed video data to the video processing apparatus 104. The CPU 101 displays a user interface screen in a color monitor 108 via a graphics accelerator 107. Meanwhile, user instructions are input via a keyboard 106 connected to a keyboard controller 105. Specifying the video data to be processed, setting internal parameters for processing, and so on are carried out using the user interface screen and the keyboard 106.

A media interface 109 is an interface for connecting media 110 (for example, a hard disk, a memory card, a CF card, an SD card, or a USB memory). Video data stored in the media 110 is transferred to the HDD 103 via the media interface 109.

In addition, the processed video data stored in the HDD 103 is transferred to the media 110 via the media interface 109. The processed video data stored in the media 110 undergoes an editing process such as cutting/stitching, video synthesis, or the like using another video editing device (not shown), and is processed into final video data.

Figure 3B:
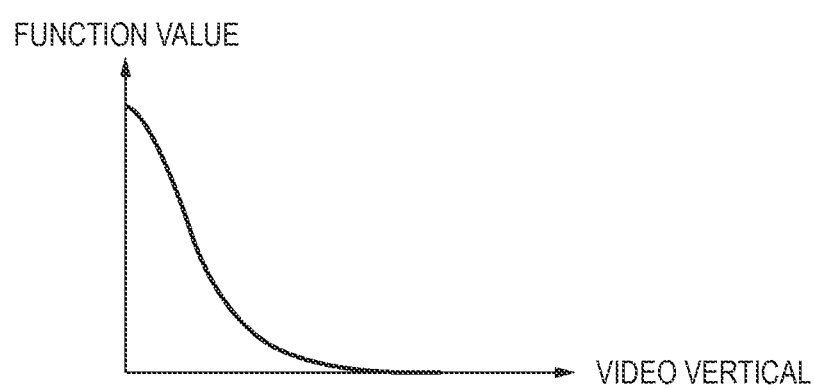
Figure 3C:
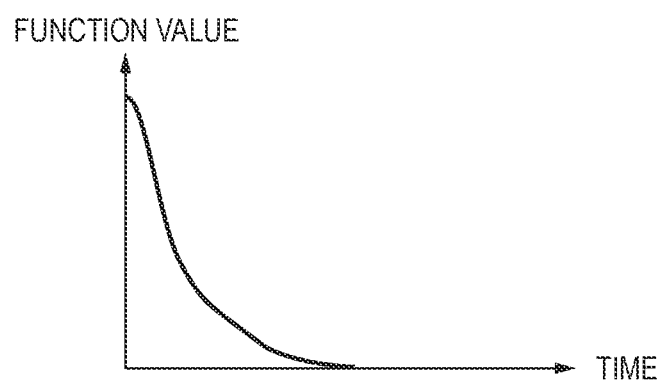

Next, the data structure of the video data will be described using the schematic diagram shown in FIG. 2. The data corresponds to a noise autocorrelation function ax in the horizontal direction of the video (in other words, the horizontal direction of a frame) written from addresses 0x0000 to 0x00FF and a noise autocorrelation function ay in the vertical direction of the video (in other words, the vertical direction of a frame) written from addresses 0x0100 to 0x01FF. Furthermore, a noise autocorrelation function at in the time direction of the video (in other words, between frames) is written from addresses 0x0200 to 0x02FF, and a video signal is written from address 0x0300. The respective autocorrelation functions are written as discrete-time digital signals, and a function value at each sample point is expressed in 32 bits. The noise autocorrelation functions express noise contained in the video as noise properties; the noise autocorrelation function in the horizontal direction and the noise autocorrelation function in the vertical direction represent spatial noise properties, whereas the noise autocorrelation function in the time direction represents temporal noise properties. When the noise autocorrelation functions are expressed as schematic diagrams, the functions have forms such as those shown in, for example, FIGS. 3A to 3C. The video signal is written in a form in which frames, or still bitmap image strings, are arranged in time order. Hereinafter, the noise properties of noise contained in a video will be called "video noise properties".

The video noise properties can be calculated in, for example, the following manner. First, an image of a uniform gray chart is captured using an image capturing device. The image capturing device that is used is an imaging device that has captured a video to be edited. Next, a region for which noise properties are to be calculated is determined in the region of the gray chart of the captured video. Noise n(x,y,t) is calculated as follows from luminosity values a(x,y,t) of pixels (x,y,t) in the video of this region.

$$n(x, y, t) = a(x, y, t) - \frac{1}{LMN}\sum_{i}^{L}\sum_{y}^{M}\sum_{t}^{N}a(x, y, t)$$

Here, L, M, and N represent maximum values of respective coordinate axis directions in the region, within a video space, for which the noise properties are to be calculated. For example, L and M represent horizontal and vertical pixel numbers, respectively, of the region within a single frame for which the noise properties are to be calculated, and N represents a number of frames for which the noise properties are to be calculated. Accordingly, the second item on the right represents an average of the pixel values within the target region. In this manner, the deviation of the luminosity values a(x,y,t) in a pixel of interest in the captured video of the gray chart is defined as the noise in the pixel of interest. The noise autocorrelation functions are calculated from this noise in the following manner.

$$ax(x) = \frac{1}{LMN}\sum_{i}^{L}\sum_{y}^{M}\sum_{t}^{N}n(i+x, y, t)n(i, y, t) \quad (1)$$

$$ay(t) = \frac{1}{LMN}\sum_{i}^{L}\sum_{y}^{M}\sum_{t}^{N}n(x, i+y, t)n(x, i, t) \quad (2)$$

$$at(x) = \frac{1}{LMN}\sum_{i}^{L}\sum_{y}^{M}\sum_{t}^{N}n(x, y, i+t)n(x, y, t) \quad (3)$$

In other words, the noise properties ax, ay, at are defined as the average values of the products of noise in two pixels distanced from each other by distances x, y, t, for the respective coordinate axis directions in the video space (in other words, horizontal, vertical, and time). The distance refers to a spatial distance in, for example, the x, y directions of the frame, and the t (time) direction refers to the time or the number of frames. For example, for a video whose frame size is 2L×2M and whose number of frames is 2N, if the target for calculation of the noise properties is taken as a region spanning to an intermediate point along those axes, the noise autocorrelation functions can be evaluated within ranges 0≤x≤L, 0≤y≤M, and 0≤t≤N).

Such processing may be provided as application software, and a user may calculate the noise properties from a captured gray chart and add information of the noise properties to the video data. Alternatively, noise properties based on conditions of the image capturing device can be created in advance by a maker and stored in the image capturing device, and a mechanism that automatically adds information of the video noise properties to the video data in accordance with the user's shooting conditions may be provided.

Here, the configuration of the video processing apparatus 104 will be described using the block diagram illustrated in FIG. 4. A bus interface 401 receives two pieces of video data transferred from the video processing apparatus 104 via the system bus 111 and stores the two pieces of data in a frame memory 402 and a frame memory 403, respectively, via an internal bus 416. Processed video data stored in a frame memory 412 and a frame memory 415 are transferred to the HDD 103 via the system bus 111.

Noise property obtainment units 417 and 418 obtain information of the video noise properties from the video data stored in the frame memory 402 and the frame memory 403, respectively. This noise property information is the property information described using FIG. 2. A noise evaluation value calculation unit 404 calculates a noise evaluation value for each piece of video data based on the obtained video noise properties and outputs the resultant as noise evaluation value data to an added noise property calculation unit 405. Based on the noise evaluation values for the two pieces of video data, the added noise property calculation unit 405 calculates the noise properties of noise added to the respective videos (added noise properties). Note that in the case where it is not necessary to add noise to one of the pieces of video data, the added noise properties thereof are "0".

An added noise calculation unit 406 creates noise video data that is actually added to the video based on the calculated added noise properties and transfers the noise video data to a frame memory 407 and a frame memory 408. A noise property correction unit 409 corrects information of the video noise properties for the video data stored in the frame memory 402 based on the added noise properties calculated by the added noise property calculation unit 405. The corrected video noise properties express noise properties of the processed video data. A noise adding unit 410 adds the noise-added video data stored in the frame memory 407 to the video data stored in the frame memory 402.

Likewise, a noise property correction unit 413 corrects information of the video noise properties for the video data stored in the frame memory 403 based on the added noise properties calculated by the added noise property calculation unit 405. A noise adding unit 414 adds the noise-added video data stored in the frame memory 408 to the video data stored in the frame memory 403.

Hereinafter, the video data stored in the frame memory 403 will be referred to as video A, whereas the video data stored in the frame memory 402 will be referred to as video B.

Next, details of the configuration of the noise evaluation value calculation unit 404 will be given using FIG. 5. The video noise properties for the video A are input from a terminal 501, and the video noise properties for the video B are input from a terminal 502. A multiplexer 503 selects one of the two instances of the input video noise properties and outputs that instance to a noise property separating circuit 504.

The noise property separating circuit 504 separates the video noise properties into the spatial noise properties and the temporal noise properties, outputs the spatial noise properties to a spatial noise evaluation value calculation circuit 505, and outputs the temporal noise properties to a temporal noise evaluation value calculation circuit 506. The spatial noise evaluation value calculation circuit 505 converts the noise autocorrelation function in the horizontal direction of the frame and the noise autocorrelation function in the vertical direction of the frame, respectively, into spatial frequency properties by performing a discrete Fourier transform thereon, multiplies the resultants by the spatial vision properties in a frequency range, and finds the sum of the resulting products. A spatial noise evaluation value Es is then calculated by multiplying the two sum values. Expressed as a formula, this is as follows.

$$Es = \sum_u (Ax(u) * VTFsx(u)) \sum_v (Ay(v) * VTFsy(v))$$

Here, Ax(u) represents the discrete Fourier transform of the noise autocorrelation function ax(x) in the horizontal direction, and Ay(v) represents the discrete Fourier transform of the noise autocorrelation function ay(y) in the vertical direction. Meanwhile, VTFsx(u) and VTFsy(v) represent the spatial vision properties in the horizontal direction and the spatial vision properties in the vertical direction, respectively, and are defined as follows.

$$VTFsx(u) = 5.05 * \left(1 - \exp\left(-0.1 * \frac{R\pi}{Nx*p*180}u\right)\right) * \exp\left(-0.138 * \frac{R\pi}{Nx*p*180}u\right)$$

$$VTFsy(v) = 5.05 * \left(1 - \exp\left(-0.1 * \frac{R\pi}{Ny*p*180}v\right)\right) * \exp\left(-0.138 * \frac{R\pi}{Ny*p*180}v\right)$$

Here, a pixel pitch is represented by p(mm), a visual range is represented by R(mm), a horizontal number of pixels in the video is represented by Nx, and a vertical number of pixels in the video is represented by Ny. VTFsx(u) and VTFsy(v) represent the spatial vision properties, or in other words, results of sampling in a frequency domain based on the visual range, the pixel pitch, and the number of pixels, as indicated by the following formula, and the basic forms thereof are the same.

$$5.05*(1-\exp(-0.1*x))*\exp(-0.138*x)$$

Figure 6A:
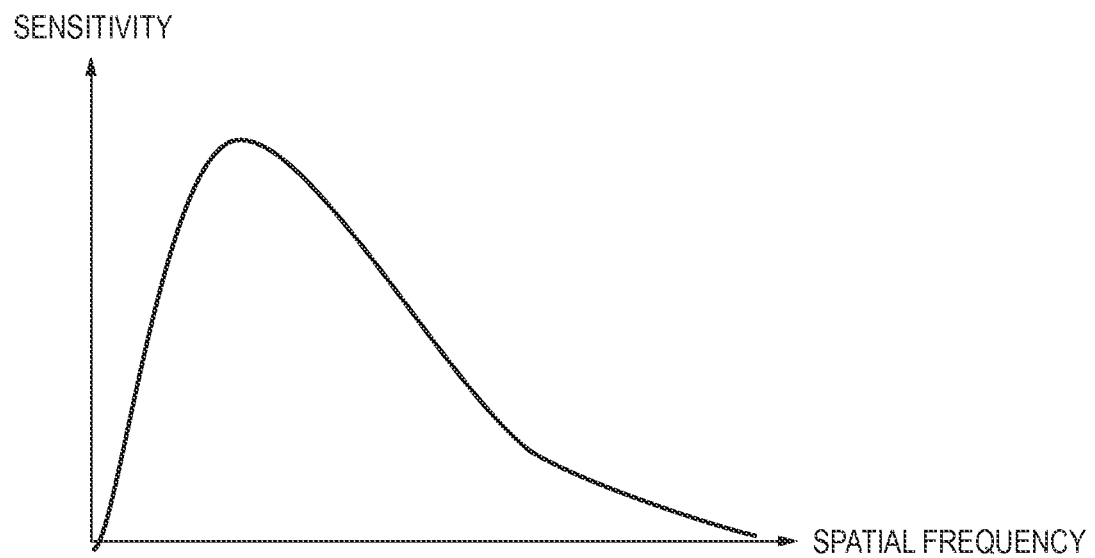
FIGS. 6A and 6B are schematic diagrams illustrating spatial vision properties.

FIG. 6A illustrates an example of the spatial vision properties according to the above formula. In this example, the spatial vision properties are the same in the horizontal direction and the vertical direction, but different vision properties may be employed in the vertical direction and the horizontal direction.

Returning to FIG. 5, after executing a discrete Fourier transform on the noise autocorrelation function in the time direction, the temporal noise evaluation value calculation circuit 506 calculates a temporal noise evaluation value Et by multiplying the temporal vision properties by a frequency range. As a formula, this is expressed as follows.

$$Et = \sum_w (At(w) * VTFt(w))$$

Here, At(w) represents the discrete Fourier transform of the noise autocorrelation function at(t) in the time direction. VTFt(w), meanwhile, represents the temporal visual properties, and is defined as follows. T represents the inverse of a framerate f (Hz), or in other words, a frame interval.

$$VTFt(w) = 4.02 * \left(1 - 0.85 * \exp\left(-0.1 * \frac{w}{2T}\right)\right) * \exp\left(-0.138 * \frac{w}{2T}\right)$$

Figure 6B:
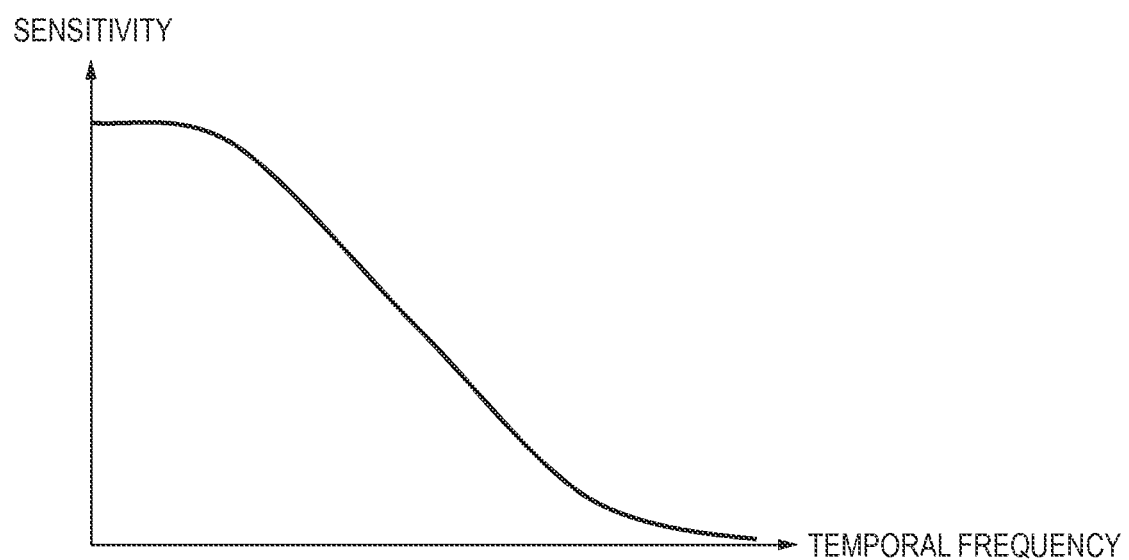

FIG. 6B illustrates an example of the temporal vision properties according to the above formula.

An evaluation value combining circuit 507 combines the spatial noise evaluation value from the spatial noise evaluation value calculation circuit 505 and the temporal noise evaluation value from the temporal noise evaluation value calculation circuit 506, and outputs the resulting set as noise evaluation value data to a demultiplexer 508. The "combining" may be, for example, an association that can be reversed. By operating in synchronization with the multiplexer 503, the demultiplexer 508 allocates the noise evaluation value data in appropriate correspondence with the original video data, and outputs the noise evaluation value data along with the spatial noise properties and the temporal noise properties to a terminal 509 and a terminal 510. The noise evaluation value data, the spatial noise properties, and the temporal noise properties for the video A are output from the terminal 509, and the noise evaluation value data, the spatial noise properties, and the temporal noise properties for the video B are output from the terminal 510.

Figure 7:
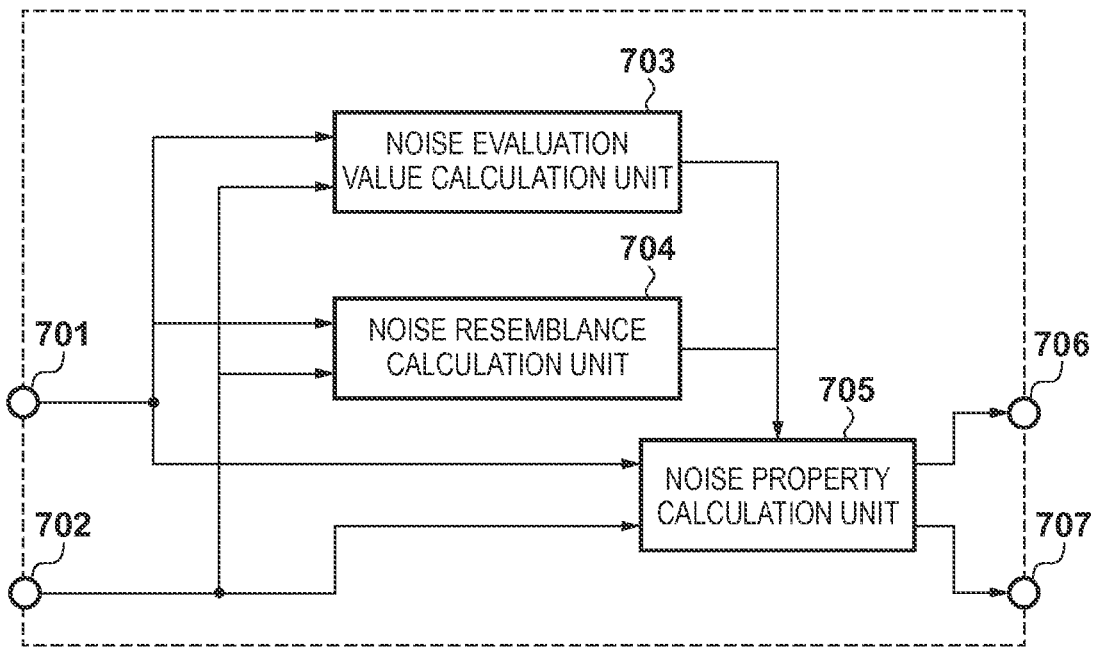
FIG. 7 is a diagram illustrating, in detail, the configuration of an added noise property calculation unit.

Next, details of the configuration of the added noise property calculation unit 405 shown in FIG. 4 will be given using FIG. 7. The noise evaluation value data, the spatial noise properties, and the temporal noise properties for the video A are input from a terminal 701, and the noise evaluation value data, the spatial noise properties, and the temporal noise properties for the video B are input from a terminal 702. A noise evaluation value calculation unit 703 calculates a noise evaluation value E=Es*Et by multiplying the spatial noise evaluation value Es and the temporal noise evaluation value Et for the video A and the video B, respectively. Hereinafter, the spatial noise evaluation value, the temporal noise evaluation value, and the noise evaluation value for the video A will be expressed as EsA, EtA, and EA, respectively. Likewise, the spatial noise evaluation value, the temporal noise evaluation value, and the noise evaluation value for the video B will be expressed as EsB, EtB, and EB, respectively.

A noise resemblance calculation unit 704 calculates, as a degree of resemblance, a cosine e defined by a vector (a noise evaluation value vector) that takes the spatial noise evaluation values and the temporal noise evaluation values of the video A and the video B, respectively, as its elements.

$$e = \frac{(EsA * EsB + EtA * EtB)}{(EsA^2 + EtA^2)^{0.5} * (EsB^2 + EtB^2)^{0.5}}$$

Figure 8:
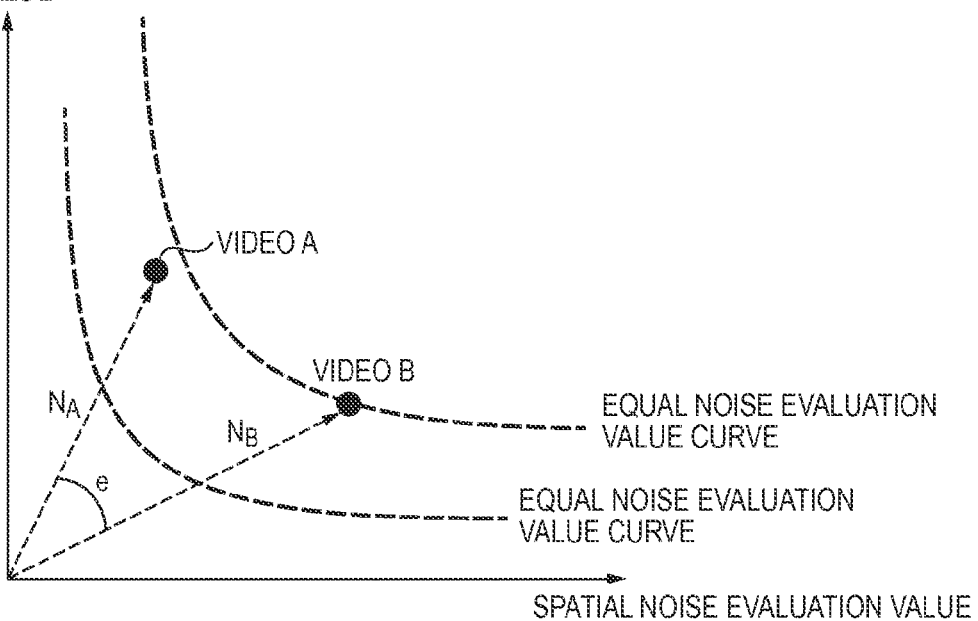
FIG. 8 is a diagram illustrating a degree of resemblance calculated between a temporal noise evaluation value and a spatial noise evaluation value.

Expressing the calculated degree of resemblance in a two-dimensional evaluation value space that takes the temporal noise evaluation value and the spatial noise evaluation value as its elements results in the graph shown in FIG. 8. Here, NA and NB express the noise evaluation values as vectors in the two-dimensional evaluation value space, where NA=(EsA, EtA) and NB=(EsB, EtB).

Returning to FIG. 7, a noise property calculation unit 705 performs case analyses based on the noise evaluation values EA and EB and the cosine e, and calculates and outputs the added noise properties for the video A and the video B as the spatial noise properties and the temporal noise properties. Operations performed for each case analysis condition will be described hereinafter.

Note that the evaluation value of the noise added to the video B is expressed as a two-dimensional vector ANB, and the evaluation value of the noise added to the video A is expressed as a two-dimensional vector ANA. The noise autocorrelation functions for the video A are assigned an index A and are consequently expressed as axA(x), ayA(y), and atA(t), and the noise autocorrelation functions for the video B are assigned an index B and are consequently expressed as axB(x), ayB(y), and atB(t).

the cosine e is greater than or equal to a predetermined value T1, and the noise evaluation values fulfill EA>EB     Condition A)

A condition A is a condition quantitatively expressing a case in which ratios between the temporal noise evaluation values and the spatial noise evaluation values of the video A and the video B are close to each other, and in which the noise evaluation value of the video A is higher.

In this condition, the added noise properties for the video A are set to "0", and thus no noise is added. Meanwhile, the added noise properties for the video B are calculated by first finding a direction and magnitude of the noise in a two-dimensional evaluation value space, and then calculating the added noise properties from the magnitude of the noise that has further been found and the noise autocorrelation function of the video A.

First, the direction and magnitude of added noise ANB for the video B in the two-dimensional evaluation value space are taken as ANB=αNA, using a coefficient α. Here, the coefficient α is calculated so that the following relationship holds true.

$$EsA*EtA=(EsB+\alpha EsA)(EtB+\alpha EtA)$$

Using the coefficient α, the added noise properties of the noise added to the video B are set so that the autocorrelation functions for the horizontal, vertical, and time directions are $\sqrt{\alpha}\cdot axA(x)$, $\sqrt{\alpha}\cdot ayA(y)$, and $\alpha\cdot atA(t)$, respectively. In this manner, added noise properties $\sqrt{\alpha}\cdot axA(x)$, $\sqrt{\alpha}\cdot ayA(y)$, and $\alpha\cdot atA(t)$ applied to the video B are obtained and output. Note that the added noise properties 0 applied to the video A indicate that it is not necessary to add noise to the video A. Meanwhile, because the autocorrelation function values are recorded in a medium along with the video to be edited, the output added noise properties may simply be the coefficient α.

Figure 9A:
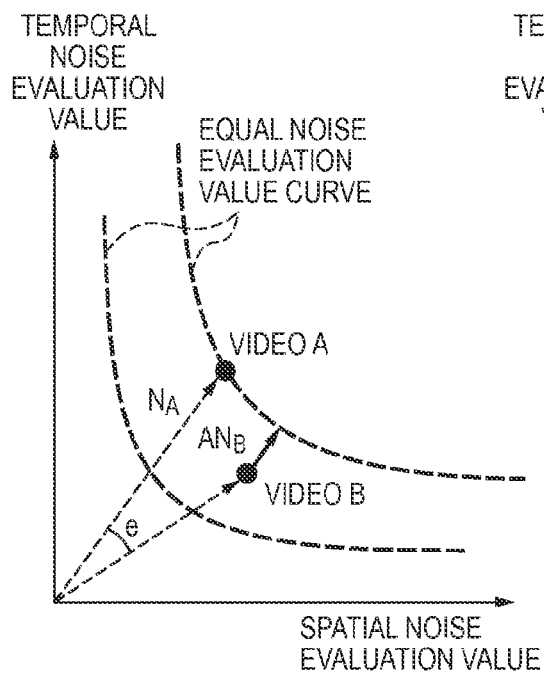
FIGS. 9A, 9B, 9C, and 9D are diagrams illustrating examples of noise evaluation value relationships.

An example of the noise evaluation value relationship under this condition is shown in a two-dimensional evaluation value space in FIG. 9A. As is clear from FIG. 9A, under this condition, noise is added to the video B so that the noise evaluation values of the video A and the video B following the addition of the noise are the same.

the cosine e is greater than or equal to the predetermined value T1, and the noise evaluation values fulfill EB>EA     Condition B)

A condition B is a condition quantitatively expressing a case in which ratios between the temporal noise evaluation values and the spatial noise evaluation values of the video A and the video B are close to each other, and in which the noise evaluation value of the video B is higher.

In this condition, the added noise properties for the video B are set to "0", and thus no noise is added. Meanwhile, the added noise properties for the video A are calculated by first finding a direction and magnitude of the noise in a two-dimensional evaluation value space, and then calculating the added noise properties from the magnitude of the noise that has further been found and the noise autocorrelation function of the video A.

First, the direction and magnitude of added noise ANA for the video A in the two-dimensional evaluation value space are taken as ANA=αNB, using the coefficient α. Here, the coefficient α is calculated so that the following relationship holds true.

$$EsB*EtB=(EsA+\alpha EsB)(EtA+\alpha EtB)$$

Using the coefficient α, the added noise properties of the noise added to the video A are set so that the autocorrelation functions are $\sqrt{\alpha}\cdot axB(x)$, $\sqrt{\alpha}\cdot ayB(y)$, and $\alpha\cdot atB(t)$. In this manner, added noise properties $\sqrt{\alpha}\cdot axB(x)$, $\sqrt{\alpha}\cdot ayB(y)$, and $\alpha\cdot atB(t)$ applied to the video A are obtained and output. Note that the added noise properties 0 applied to the video B indicate that it is not necessary to add noise to the video B. As with the condition A, the output added noise properties may simply be the coefficient α.

Figure 9B:
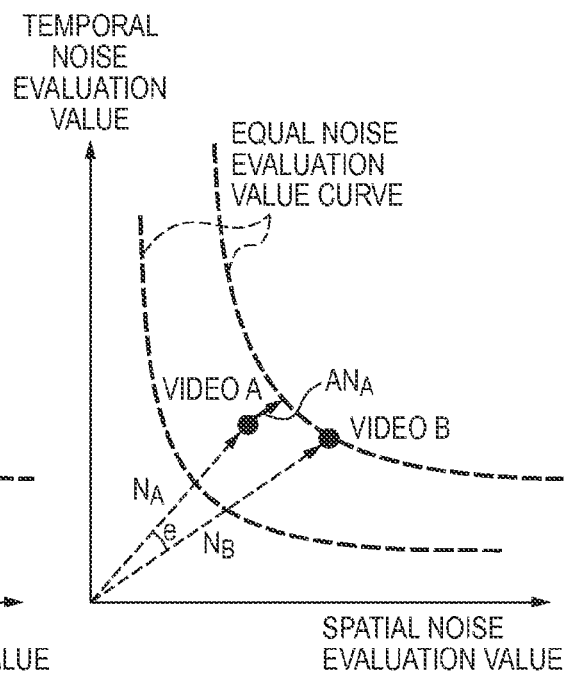

An example of the noise evaluation value relationship under this condition is shown in a two-dimensional evaluation value space in FIG. 9B. As is clear from FIG. 9B, under this condition, noise is added to the video A so that the noise evaluation values of the video A and the video B following the addition of the noise are the same.

the cosine e is less than the predetermined value T1, and one of the noise evaluation values EA and EB is less than T2     Condition C)

A condition C is a condition quantitatively expressing a case in which ratios between the temporal noise evaluation values and the spatial noise evaluation values of the video A and the video B are not close to each other, and in which the noise evaluation value of one of the videos is extremely low.

Under this condition, the added noise properties of the noise added to the video A are set so that the autocorrelation functions are axB(x), ayB(y), and atB(t). Meanwhile, the added noise properties of the noise added to the video B are set so that the autocorrelation functions are axA(x), ayA(y), and atA(t). The added noise properties obtained in this manner are then output. As with the condition A, the output added noise properties may simply be the coefficients. In this case, the coefficients are 1 for both the videos A and B.

Figure 9C:
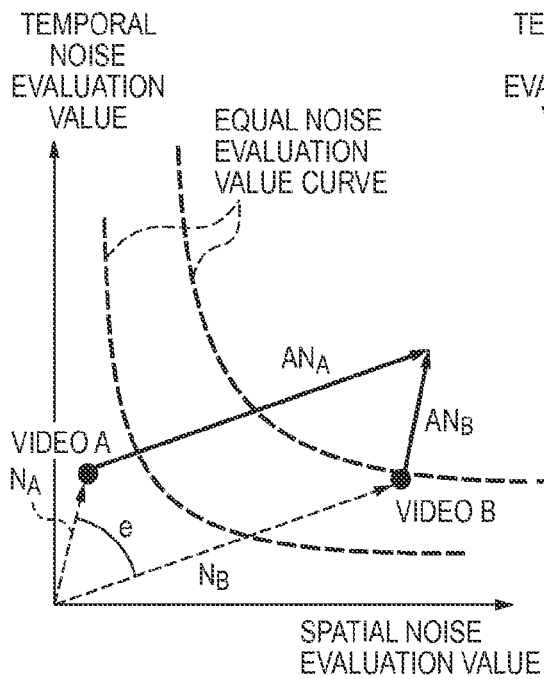

An example of the noise evaluation value relationship under this condition is shown in a two-dimensional evaluation value space in FIG. 9C. As is clear from FIG. 9C, under this condition, the added noise properties for the video A and added noise properties for the video B are set so that the noise in the video A and the noise in the video B are the same in the two-dimensional evaluation value space.

the cosine $e$ is less than the predetermined value $T1$,
and both of the noise evaluation values $EA$ and
$EB$ are greater than or equal to $T2$     Condition D)

A condition D is a condition quantitatively expressing a case in which ratios between the temporal noise evaluation values and the spatial noise evaluation values of the video A and the video B are not close to each other, and in which the noise evaluation values of both of the videos are greater than or equal to a set value.

Under this condition, the added noise properties for the video A and the video B are calculated by finding a direction and magnitude of the noise in a two-dimensional evaluation value space, and then calculating the added noise properties from the magnitude of the noise that has further been found and the noise autocorrelation functions of the videos.

The direction and magnitude of added noise ANA for the video A in the two-dimensional evaluation value space are taken as ANA=αNB, using the coefficient α. Here, the coefficient α is calculated so that the following relationship holds true.

$$T3=(EsA+\alpha EsB)(EtA+\alpha EtB)$$

The direction and magnitude of added noise ANB for the video B in the two-dimensional evaluation value space are taken as ANB=βNA, using a coefficient β. Here, the coefficient β is calculated so that the following relationship holds true.

$$T3=(EsB+\beta EsA)(EtB+\beta EtA)$$

Note that T3 is a constant indicating a predetermined noise evaluation value. If T3 is too great, the appearance of noise in the video A and the video B will match, but the video will be noisy; if T3 is too low, the appearance of noise will not match. The constant T3 is appropriately determined in order to find the balance between the two. Accordingly, for example, T3 can be determined experimentally by comparing samples of the videos A and B after the application of the added noise. Alternatively, a method in which, for example, the cosine e defined by noise evaluation value vectors following the application of the added noise to the videos A and B is set to be T1 can also be considered. In other words, the added noise properties are determined so that $(EsA+\alpha EsB)*(EtA+\alpha EtB)=(EsB+\beta EsA)*(EtB+\beta EtA)=T3$ and $e=((EsA+\alpha EsB)*(EsB+\beta EsA)+(EtA+\alpha EtB)*(EtB+\beta EtA))/(\sqrt{(EsA+\alpha EsB)^2+(EtA+\alpha EtB)^2})*\sqrt{((EsB+\beta EsA)^2+(EtB+\beta EtA)^2)}=T1$. In this case, the coefficients α and β can be determined without particularly defining the value of the constant T3. As with the condition A and so on, the output added noise properties may simply be the coefficients α and β.

Using the coefficient α, the added noise properties of the noise added to the video A are set so that the autocorrelation functions are $\sqrt{\alpha}\cdot axB(x)$, $\sqrt{\alpha}\cdot ayB(y)$, and $\alpha\cdot atB(t)$. Meanwhile, using the coefficient β, the added noise properties of the noise added to the video B are set so that the autocorrelation functions are $\sqrt{\beta}\cdot axA(x)$, $\sqrt{\beta}\cdot ayA(y)$, and $\beta\cdot atA(t)$.

Figure 9D:
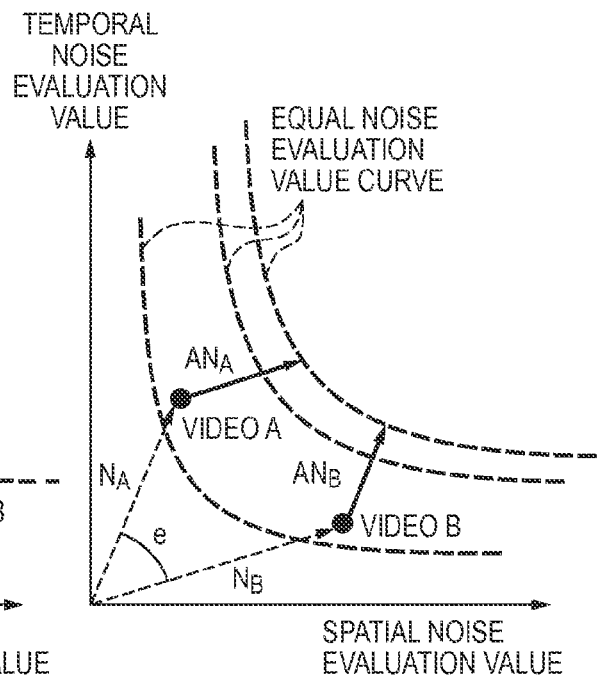

An example of the noise evaluation value relationship under this condition is shown in a two-dimensional evaluation value space in FIG. 9D. As is clear from FIG. 9D, under this condition, noise is added to both the video A and the video B so that the noise evaluation values of the video A and the video B following the addition of the noise are the same.

As is clear from the descriptions made thus far, in all of the conditions A through D, the ratio between the temporal noise evaluation value and the spatial noise evaluation value in the added noise is set to be the same as the ratio between the temporal noise evaluation value and the spatial noise evaluation value in the video noise. By setting the added noise in this manner, the appearance of noise can be coordinated among a plurality of pieces of video without producing a sense of incongruity.

Returning to FIG. 7, the added noise properties calculated by the noise property calculation unit 705 are output from a terminal 706, for the added noise properties for the video A, and are output from a terminal 707, for the added noise properties for the video B. Although a cosine defined by the noise evaluation value vectors of two videos is used to determine the condition in the present embodiment, it should be noted that the same effects are obtained even if the reverse function of the cosine is taken and converted into an angle.

Figure 10:
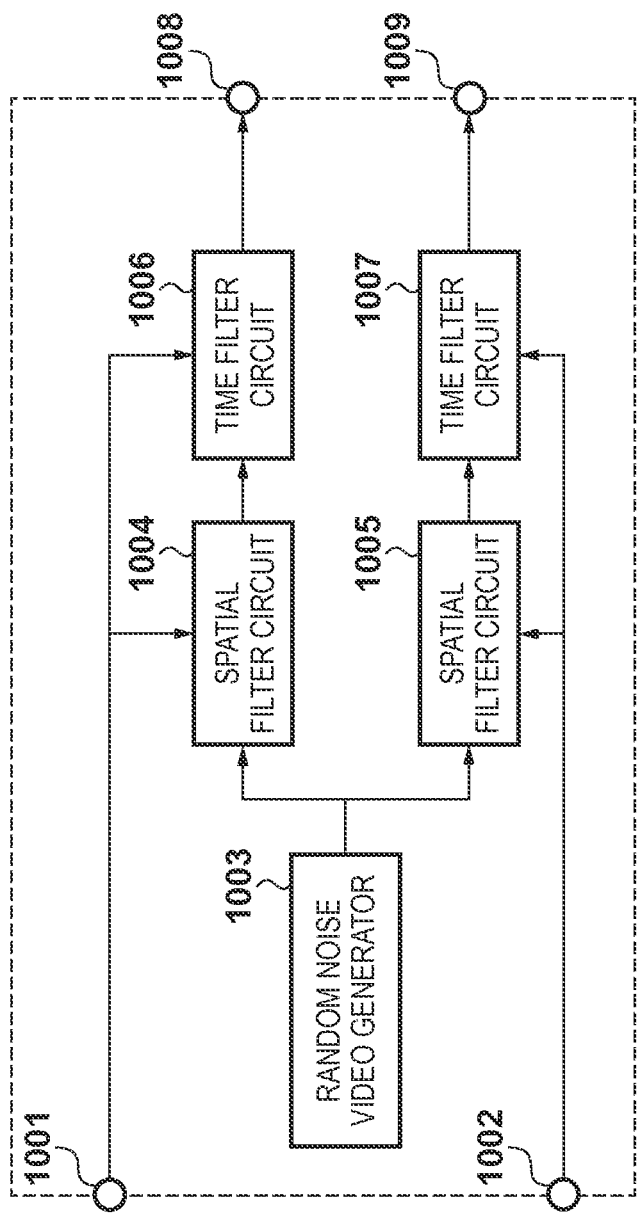
FIG. 10 is a diagram illustrating, in detail, the configuration of an added noise calculation unit.

Next, details of the configuration of the added noise calculation unit 406 shown in FIG. 4 will be given using FIG. 10. The added noise properties for the video A are input into a terminal 1001, and the added noise properties for the video B are input into a terminal 1002. Of the added noise properties for the video A that are input into the terminal 1001, the noise autocorrelation functions in the spatial directions are set in a spatial filter circuit 1004, whereas the noise autocorrelation functions in the time direction is set in a time filter circuit 1006. When setting the noise autocorrelation functions in the spatial and time filter circuits, the noise autocorrelation functions are directly set in the filters as impulse responses. In other words, assuming the autocorrelation function is a(x), a filter coefficient f(x) is set as f(x)=a(x). For example, under the condition D, the spatial filter circuit 1004 uses a filter (βax(0), βax(1), . . . , βax(L)) for the horizontal direction of the frame and a filter (βay(0), βay(1), . . . , βay(M)) for the vertical direction of the frame. Meanwhile, the time filter circuit 1006 uses a filter (βat(0), βat(1), . . . , βat(N)).

Of the added noise properties for the video B that are input into the terminal 1002, the noise autocorrelation functions in the spatial directions are set in a spatial filter circuit 1005, whereas the noise autocorrelation functions in the time direction is set in a time filter circuit 1007. For example, under the condition D, the spatial filter circuit 1005 uses a filter (αax(0), αax(1), . . . , αax(L)) for the horizontal direction of the frame and a filter (αay(0), αay(1), . . . , αay(M)) for the vertical direction of the frame. Meanwhile, the time filter circuit 1007 uses a filter (αat(0), αat(1), . . . , αat(N)).

A random noise video generator 1003 generates a random noise video having a predetermined power that is uncorrelated in the time direction and the spatial directions. The generated random noise video is split into two pieces, with one of the pieces being filtered by the spatial filter circuit 1004 and the time filter circuit 1006 and output to the frame memory 408 from a terminal 1008 as the noise-added video data for the video A. The other piece is filtered by the spatial filter circuit 1005 and the time filter circuit 1007 and output to the frame memory 407 from a terminal 1009 as the noise-added video data for the video B. By using these filter circuits to filter the random noise, it is possible to generate noise having properties expressed by the added noise autocorrelation functions. Accordingly, by synthesizing the generated noise-added video data with the respective pieces of video, noise properties resulting from the added noise synthesis as indicated in FIGS. 9A through 9D can be added to the respective pieces of video.

According to the present embodiment, an appearance of noise can be converted into numerical values as evaluation values and coordinated between pieces of video having different temporal/spatial noise properties. Accordingly, a video editor can coordinate the appearance of noise among a plurality of pieces of video without adjusting the noise, making it possible to suppress a sense of incongruity arising due to differences in the appearances of noise when editing the video by performing synthesis, stitching, and so on.

Second Embodiment

In the first embodiment, the properties of the noise to be added are determined based on the noise in the input video. However, although this method is simple, a high amount of noise is added, and there are cases where the resulting video will be noisy.

Accordingly, in the second embodiment, the amount of noise that is added is reduced by controlling the properties of the added noise. Hereinafter, the added noise property calculation unit 405, which is the difference between the present embodiment and the first embodiment, will be described.

Figure 11:
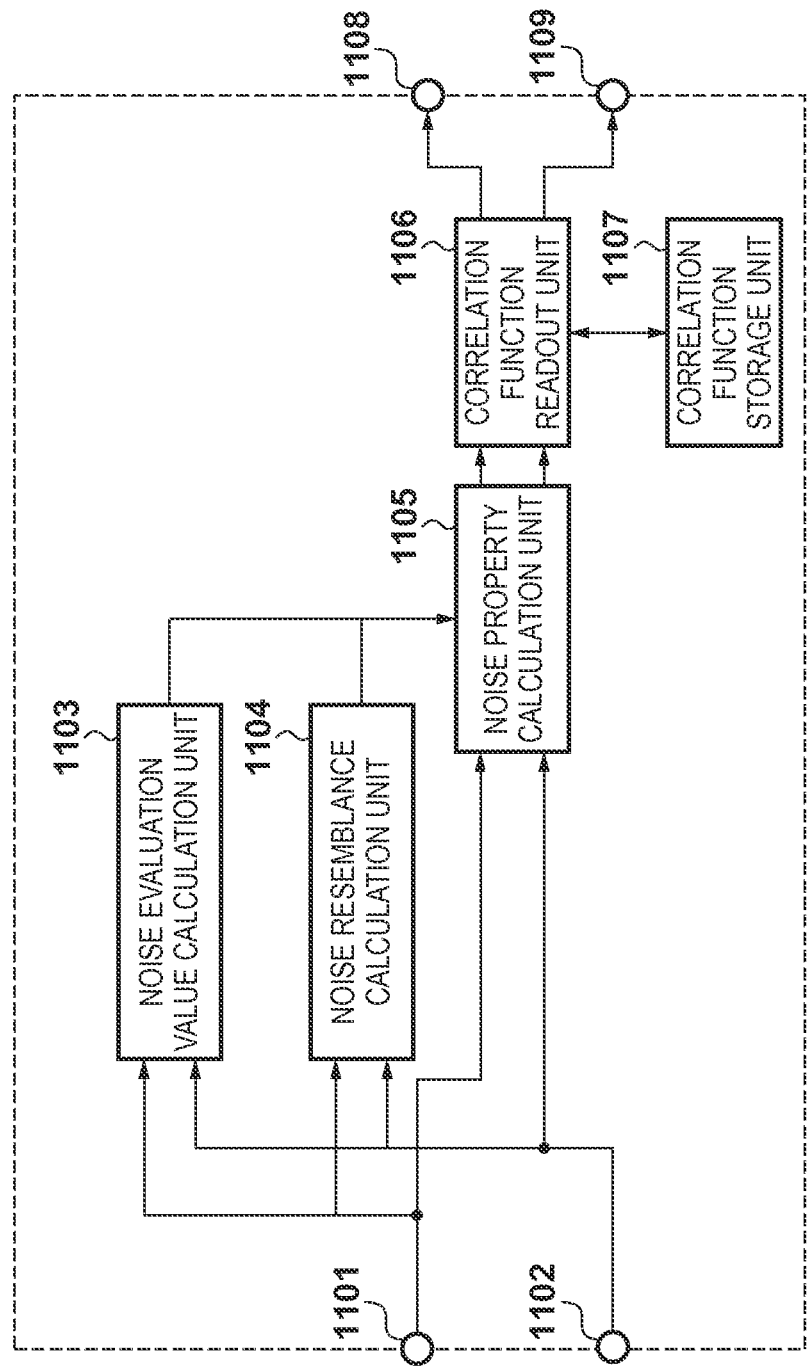
FIG. 11 is a diagram illustrating, in detail, the configuration of an added noise property calculation unit according to a second embodiment.

Details of the configuration of the added noise property calculation unit 405 according to the present embodiment will be given using FIG. 11. The noise evaluation value data, the spatial noise properties, and the temporal noise properties for the video A are input into a terminal 1101. The noise evaluation value data, the spatial noise properties, and the temporal noise properties for the video B are input into a terminal 1102. A noise evaluation value calculation unit 1103 calculates a noise evaluation value by multiplying the spatial noise evaluation value and the temporal noise evaluation value for the video A and the video B, respectively.

A noise resemblance calculation unit 1104 calculates a distance d and a cosine e as a degree of resemblance. First, the difference between the video A and the video B in a two-dimensional evaluation value space is calculated as a vector Nd=(Esd, Etd).

When $EsA \times EtA < EsB \times EtB, Nd=NB-NA$

When $EsA \times EtA \geq EsB \times EtB, Nd=NA-NB$

Using the calculated vector Nd, the distance d is calculated as d=|Nd|. Meanwhile, the cosine e is calculated as follows.

When $EsA \times EtA < EsB \times EtB$, $$e = \frac{(EsA * Esd + EtA * Etd)}{(EsA^2 + EtA^2)^{0.5} * (Esd^2 + Etd^2)^{0.5}}$$

When $EsA \times EtA \geq EsB \times EtB$, $$e = \frac{(Esd * EsB + Etd * EtB)}{(Esd^2 + Etd^2)^{0.5} * (EsB^2 + EtB^2)^{0.5}}$$

Figure 12:
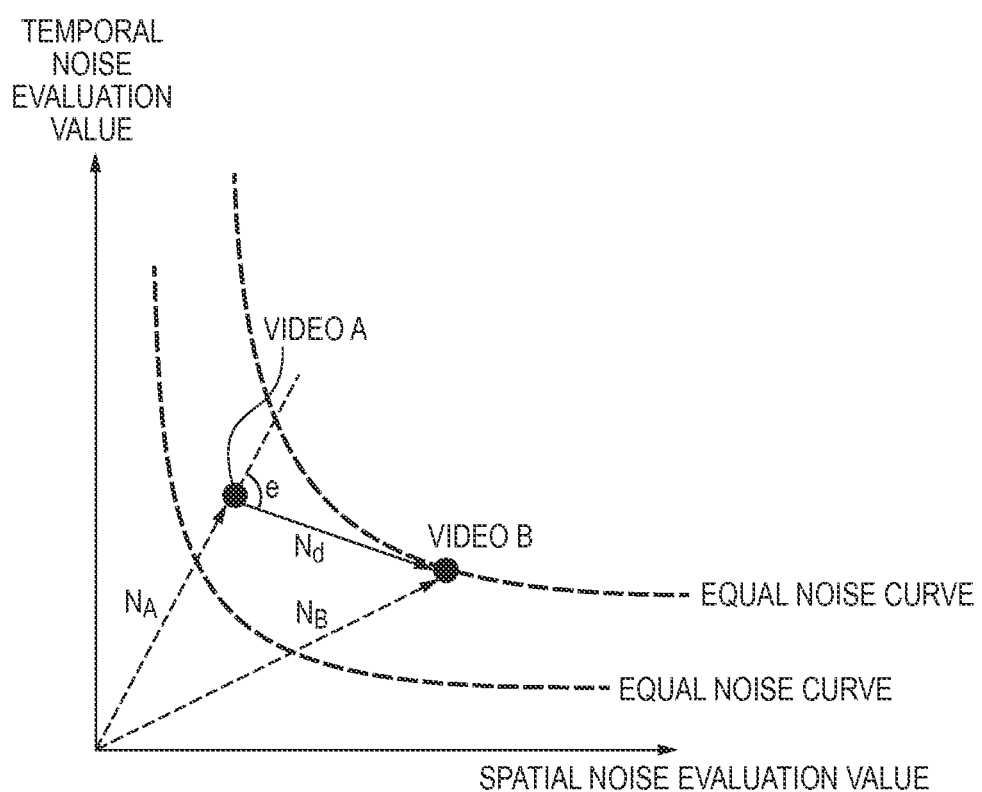
FIG. 12 is a diagram illustrating a degree of resemblance according to the second embodiment.

Here, the relationship in the two-dimensional evaluation value space in the case where, for example, EsA×EtA<EsB× EtB is as shown in FIG. 12.

Returning to FIG. 11, a noise property calculation unit 1105 performs case analyses based on the noise evaluation values EA and EB and the cosine e. Furthermore, the added noise properties for the video A and the video B are calculated and output as the spatial noise properties and the temporal noise properties in accordance with the distance d.

However, unlike the noise property calculation unit 705 according to the first embodiment, the noise property calculation unit 1105 according to the present embodiment only calculates the noise properties in the two-dimensional evaluation value space, and does not calculate correlation functions. Operations performed for each case analysis condition will be described hereinafter.

the cosine e is less than a predetermined value, and
$EsA < EsB$ and $EtA < EtB$            Condition A)

Figure 13A:
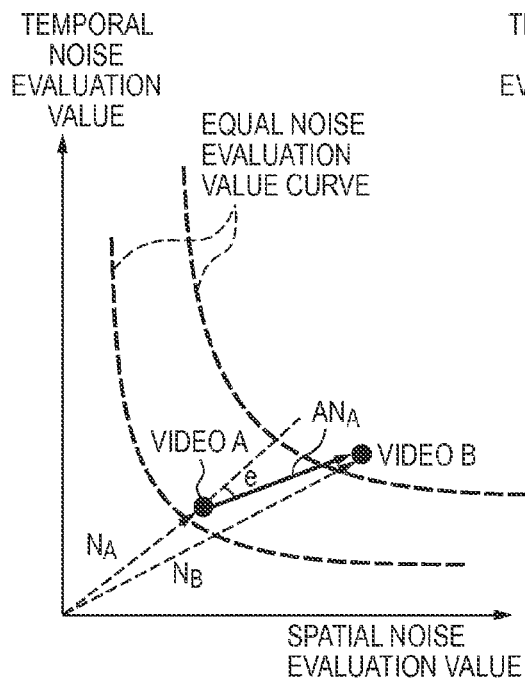
FIGS. 13A, 13B, 13C, and 13D are diagrams illustrating examples of noise evaluation value relationships according to the second embodiment.

In this condition, the added noise properties for the video B are set to "0", and thus no noise is added. Meanwhile, the added noise properties for the video A are taken as added noise (ANA=NB−NA) in the two-dimensional evaluation value space. An example of the noise evaluation value relationship under this condition is shown in a two-dimensional evaluation value space in FIG. 13A.

the cosine e is less than a predetermined value, and
$EsA \geq EsB$ and $EtA \geq EtB$            Condition B)

Figure 13B:
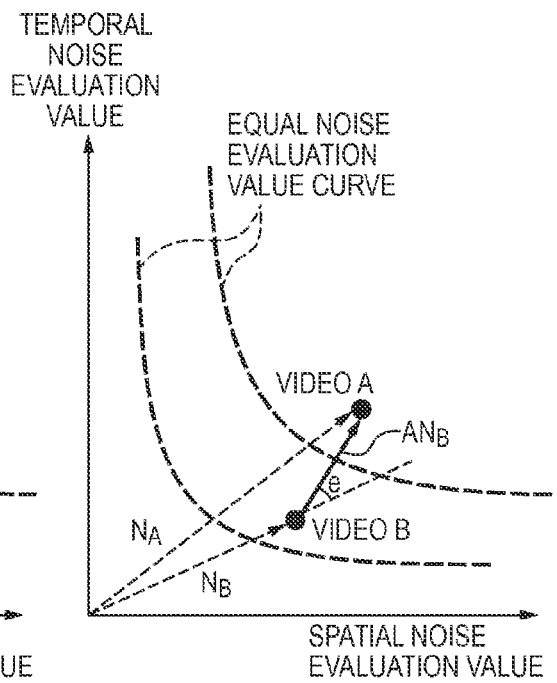

In this condition, the added noise properties for the video A are set to "0", and thus no noise is added. Meanwhile, the added noise properties for the video B are taken as added noise (ANB=NA−NB) in the two-dimensional evaluation value space. An example of the noise evaluation value relationship under this condition is shown in a two-dimensional evaluation value space in FIG. 13B.

the cosine e is greater than or equal to a predetermined value            Condition C)

Under this condition, the directions of the added noise properties for the video A and the added noise properties for the video B are determined, after which the magnitude of the noise is determined. First, angles fA and fB at which vectors NA and NB form spatial noise evaluation axes are found as cosines.

$$f_A = EsA \big/ (EsA^2 + EtA^2)^{0.5}$$

$$f_B = EsB \big/ (EsB^2 + EtB^2)^{0.5}$$

Next, the direction of the added noise ANA is calculated as a cosine gA in accordance with the distance d. Likewise, the direction of the added noise ANB is calculated as a cosine gB in accordance with the distance d. Note that a function that takes the distance d as an input is used in the calculation.

Figure 14A:
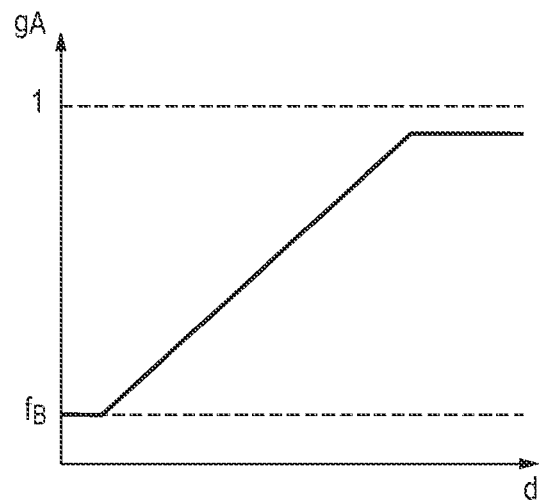
FIGS. 14A, 14B, 14C, and 14D are diagrams illustrating functions for performing calculations based on a distance, using a direction of added noise as a cosine.
Figure 14B:
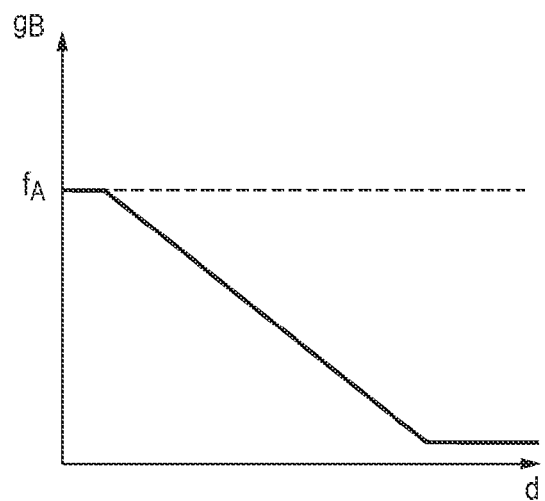

In the case where EsA<EsB, gA is calculated through a function such as that shown in FIG. 14A, whereas gB is calculated through a function such as that shown in FIG. 14B. As is clear from FIGS. 14A and 14B, in the case where the distance d is low, the added noise ANA is close to the noise in the video B, and the spatial noise becomes more dominant as the distance d increases. On the other hand, in the case where the distance d is low, the added noise ANB is close to the noise in the video A, and the temporal noise becomes more dominant as the distance d increases.

Figure 14C:
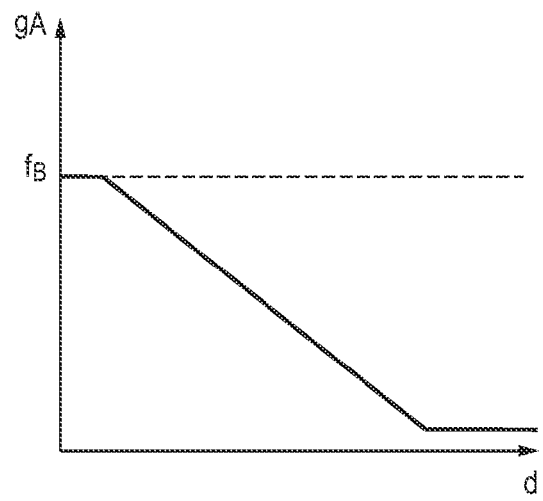
Figure 14D:
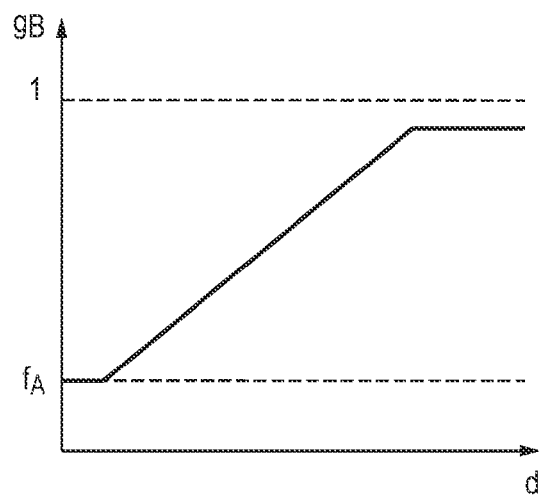

In the case where EsA≥EsB, gA is calculated through a function such as that shown in FIG. 14C, whereas gB is calculated through a function such as that shown in FIG. 14D. As is clear from FIGS. 14C and 14D, in the case where the distance d is low, the added noise ANA is close to the noise in the video B, and the temporal noise becomes more dominant as the distance d increases. On the other hand, in the case where the distance d is low, the added noise ANB is close to the noise in the video A, and the spatial noise becomes more dominant as the distance d increases. Note that the relationships between the distances on the cosines indicated in FIGS. 14A through 14D can be determined in advance.

Figure 13C:
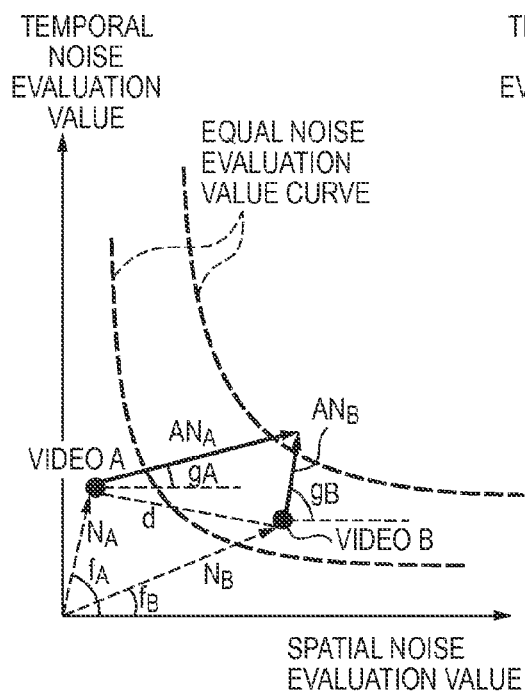
Figure 13D:
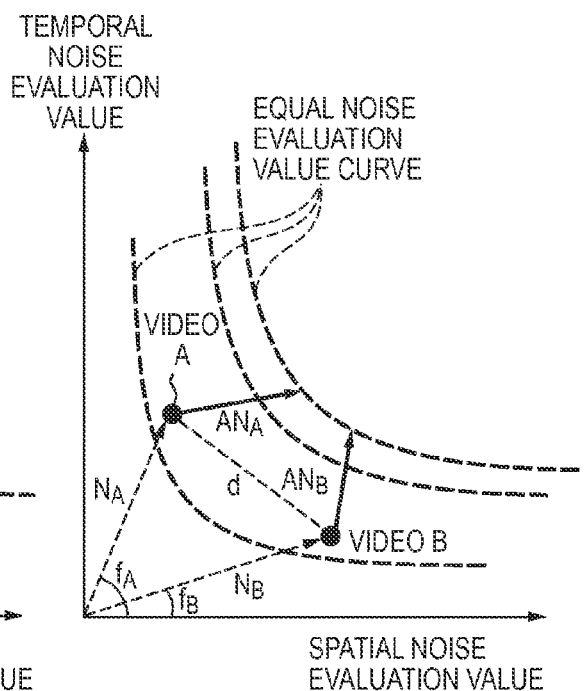

Here, the magnitudes of the added noise ANA and the added noise ANB are corrected so that the coordinates at which the added noise ANA is added in the video A are the same as the coordinates at which the added noise ANB is added in the video B. FIG. 13C is a schematic diagram showing the result of the correction. Note that in order to prevent the video from becoming noisy, in the case where the noise evaluation values at the calculated coordinates exceed a predetermined value, the magnitudes of the added noise ANA and the added noise ANB are clipped so that the noise evaluation values in the respective videos become predetermined noise evaluation values. FIG. 13D is a schematic diagram showing the result of this correction.

As is clear from the descriptions given thus far, the present embodiment differs from the first embodiment in that the present embodiment aims to reduce the calculated noise amount. Accordingly, there are cases where the ratio between the temporal noise evaluation value and the spatial noise evaluation value in the added noise is not the same as the ratio between the temporal noise evaluation value and the spatial noise evaluation value in the video noise.

Returning to FIG. 11, based on the properties of the added noise ANA and the added noise ANB calculated by the noise property calculation unit 1105, a correlation function readout unit 1106 selects correlation functions that result in the closest properties from among correlation functions prepared in advance in a correlation function storage unit 1107, and reads out the respective correlation functions from the correlation function storage unit 1107. It is desirable to compare the closest properties using noise evaluation value vectors. Note that because the magnitude of a vector can be adjusted by multiplying that vector by a coefficient, the resemblance of noise properties can be evaluated based on the direction of the noise evaluation value vectors, such as, for example, an angle formed with one of the coordinate axes, the resemblance of the cosine, and so on. Accordingly, for example, correlation functions may be associated with a plurality of cosine values and stored in the correlation function storage unit 1107, and in this case, for example, the correlation functions associated with the cosine values that are closest to the cosines gA and gB in FIG. 13C are selected. Note that in the case where the magnitudes of the vectors differ, the magnitudes can be adjusted by multiplying the selected correlation function values by a coefficient. The selected correlation functions and coefficients are then output from terminals 1108 and 1109.

As described above, frames of random noise are filtered using filters obtained for the videos A and B, and the obtained noise videos are synthesized with the videos A and B, respectively, that are to be edited. The two videos synthesized in this manner have visual noise properties that resemble each other, and thus a sense of incongruity in the appearance of the noise can be reduced even if the videos are stitched together, synthesized, or the like.

Furthermore, according to the present embodiment, when coordinating the appearance of noise among a plurality of videos having different temporal or spatial noise properties, the properties of the noise that is added are controlled in accordance with the degree of resemblance of the video noise, which makes it possible to reduce the amount of noise that is added. Accordingly, when coordinating the appearance of noise between a plurality of videos, the videos can be prevented from becoming noisy to the greatest extent possible.

Although the noise evaluation values evaluate both the spatial and temporal properties in the first and second embodiments, it should be noted that the configuration may be such that only one of these is evaluated.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2012-094177, filed Apr. 17, 2012, and 2013-080843, filed Apr. 8, 2013, which are hereby incorporated by reference herein in their entirety.

What is claimed is:
1. An image processing apparatus comprising:
an input unit configured to input first video data captured based on a first capturing parameter and second video data captured based on a second capturing parameter;
an evaluation unit configured to obtain a first temporal noise evaluation value for the first video data based on the first video data and a temporal visual property corresponding to the first video data, a first spatial noise evaluation value for the first video data based on the first video data and a spatial visual property corresponding to the first video data, a second temporal noise evaluation value for the second video data based on the second video data and a temporal visual property corresponding to the second video data, and a second spatial noise evaluation value for the second video data based on the second video data and a spatial visual property corresponding to the second video data;
an added noise determination unit configured to determine noise data to be added to at least one of the first and second video data based on the first and second temporal noise evaluation values corresponding to the first and second video data and the first and second spatial noise evaluation values corresponding to the first and second video data, so that a difference between a temporal noise evaluation value corresponding to the first video data and a temporal noise evaluation value corresponding to the second video data after addition of the noise data is smaller than a difference between the first and second temporal noise evaluation values and so that a difference between a spatial noise evaluation value corresponding to the first video data and a spatial noise evaluation value corresponding to the second video data after addition of the noise data is smaller than a difference between the first and second spatial noise evaluation values; and
a noise adding unit configured to add the noise data to at least one of first and second video data.

2. The image processing apparatus according to claim 1, wherein the spatial noise evaluation values are noise evaluation values in a spatial direction and the temporal noise evaluation values are noise evaluation values in a time direction.

3. The image processing apparatus according to claim 1, wherein the added noise determination unit is configured to:
calculate a degree of resemblance of the noises for the first and second video data;
calculate noise properties of noise to be added in accordance with the calculated degree of resemblance of the noises for the first and second video data; and
calculate the noise data based on the calculated noise properties.

4. The image processing apparatus according to claim 3, wherein the noise data to be added is calculated so that the temporal noise evaluation values for the first and second video data are the same after addition of the noise data and the spatial noise evaluation values for the first and second video data are the same after addition of the noise data.

5. The image processing apparatus according to claim 3, wherein the noise properties of the noise data to be added are calculated based on a relationship between the spatial noise evaluation value and the temporal noise evaluation value.

6. The image processing apparatus according to claim 1, wherein the added noise determination unit is configured to determine the noise data so that the first spatial noise evaluation value and the first temporal noise evaluation value corresponding to the first video data have a predetermined relationship and the second spatial noise evaluation value and the second temporal noise evaluation value corresponding to the second video data have the predetermined relationship after addition of the noise data determined by the added noise determination unit, and
wherein the first spatial noise evaluation value of the first video data and the second spatial noise evaluation value of the second video data after addition of the noise data are different, and the first temporal noise evaluation value of the first video data and the second temporal noise evaluation value of the second video data after addition of the noise data are different.

7. An image processing method executed by an image processing apparatus, the method comprising:
inputting first video data captured based on a first capturing parameter and second video data captured based on a second capturing parameter;
obtaining a first temporal noise evaluation value for the first video data based on the first video data and a temporal visual property corresponding to the first video data, a first spatial noise evaluation value for the first video data based on the first video data and a spatial visual property corresponding to the first video data, a second temporal noise evaluation value for the second video data based on the second video data and the temporal visual property corresponding to the second video data, and a second spatial noise evaluation value for the second video data based on the second video data and the spatial visual property corresponding to the second video data;
determining noise data to be added to at least one of the first and second video data based on the first and second temporal noise evaluation values corresponding to the first and second video data and the first and second spatial noise evaluation values corresponding to the first and second video data, so that a difference between a temporal noise evaluation value corresponding to the first video data and a temporal noise evaluation value corresponding to the second video data after addition of the noise data is smaller than a difference between the first and second temporal noise evaluation values and so that a difference between a spatial noise evaluation value corresponding to the first video data and a spatial noise evaluation value corresponding to the second video data after addition of the noise data is smaller than a difference between the first and second spatial noise evaluation values; and
adding the noise data to at least one of the first and second video data.

8. The image processing method according to claim 7, wherein the noise data is determined so that the first spatial noise evaluation value and the first temporal noise evaluation value corresponding to the first video data have a predetermined relationship and the second spatial noise evaluation value and the second temporal noise evaluation value corresponding to the second video data have the predetermined relationship after addition of the noise data determined in the determining step, and
wherein the first spatial noise evaluation value of the first video data and the second spatial noise evaluation value of the second video data after addition of the noise data are different, and the first temporal noise evaluation value of the first video data and the second temporal noise evaluation value of the second video data after addition of the noise data are different.

9. A non-transitory computer-readable medium in which is recorded a program for causing a computer to:
input first video data captured based on a first capturing parameter and second video data captured based on a second capturing parameter;
obtain a first temporal noise evaluation value for the first video data based on the first video data and a temporal visual property corresponding to the first video data, a first spatial noise evaluation value for the first video data based on the first video data and a spatial visual property corresponding to the first video data, a second temporal noise evaluation value for the second video data based on the second video data and the temporal visual property corresponding to the second video data, and a second spatial noise evaluation value for the second video data based on the second video data and the spatial visual property corresponding to the second video data;
determine noise data to be added to at least one of the first and second video data based on the first and second temporal noise evaluation values corresponding to the first and second video data and the first and second spatial noise evaluation values corresponding to the first and second video data, so that a difference between a temporal noise evaluation value corresponding to the first video data and a temporal noise evaluation value corresponding to the second video data after addition of the noise data is smaller than a difference between the first and second temporal noise evaluation values and so that a difference between a spatial noise evaluation value corresponding to the first video data and a spatial noise evaluation value corresponding to the second video data after addition of the noise data is smaller than a difference between the first and second spatial noise evaluation values; and
add the noise data to at least one of first and second video data.

* * * * *